United States Patent [19]

Monti

[11] Patent Number: 4,588,866
[45] Date of Patent: May 13, 1986

[54] MODULAR WALL PHONE LATCHING MECHANISM

[75] Inventor: James H. Monti, Corinth, Miss.

[73] Assignee: International Telephone and Telegraph Corporation, New York, N.Y.

[21] Appl. No.: 438,472

[22] Filed: Nov. 3, 1982

[51] Int. Cl.$^4$ ............................................. H04M 1/11
[52] U.S. Cl. ............................ 179/100 R; 179/146 R; 179/178
[58] Field of Search ........... 179/100 C, 100 D, 100 R, 179/178, 146 R; 248/551, 223.1, 221.3, 222.1

[56] References Cited

U.S. PATENT DOCUMENTS

| | | | |
|---|---|---|---|
| 3,125,316 | 3/1964 | Wilmhoff | 248/551 |
| 3,211,409 | 10/1965 | Zimmermann | 248/223.1 |
| 3,709,456 | 1/1973 | Pietsch | 248/551 |
| 3,840,711 | 10/1974 | Tucker | 179/146 R |
| 3,898,394 | 8/1975 | Ward et al. | 179/146 R |
| 4,349,706 | 9/1982 | Thompson | 179/100 C |

Primary Examiner—Gene Z. Rubinson
Assistant Examiner—R. Vaas
Attorney, Agent, or Firm—John T. O'Halloran; Thomas F. Meagher

[57] ABSTRACT

A mechanism for latching a modular wall phone to a mounting receptacle plate. As is conventional, the plate has a central aperture for a modular jack and spaced on each vertical side of the aperture is a headed stud or rivet. The wall phone has a base plate with a central slot through which a plug on a line cord extends to mate with the jack. The base also has keyhole slots for receiving and mating with the headed studs. Adjacent at least one stud is the present latching mechanism which is readily assembled to the base plate with the phone separated from the receptacle plate. The latch mechanism automatically engages the headed stud and latches to it when the phone is mounted on the wall. The mechanism is accessible from exterior of the phone to release the latch and enable removal of the phone from the receptacle plate.

6 Claims, 8 Drawing Figures

U.S. Patent   May 13, 1986   Sheet 1 of 2   4,588,866
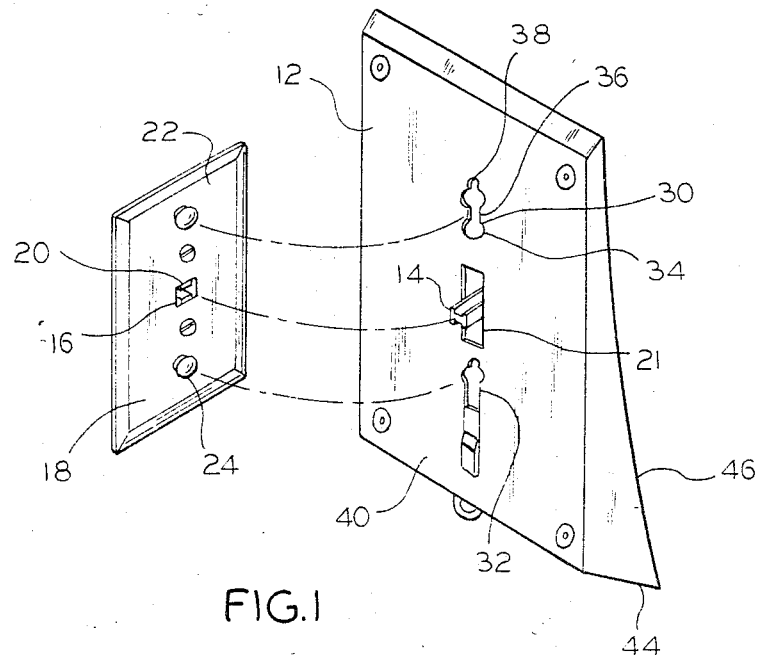
FIG. 1
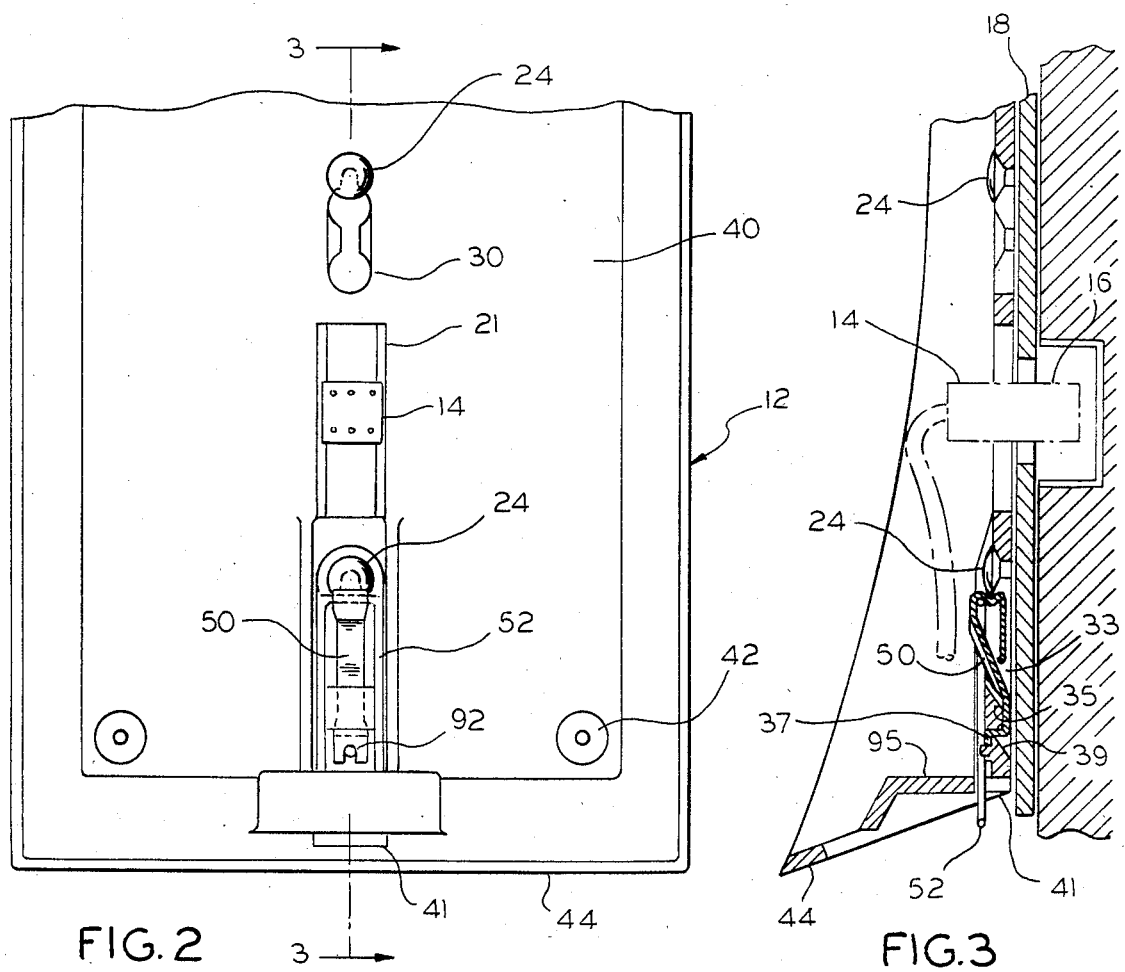
FIG. 2
FIG. 3

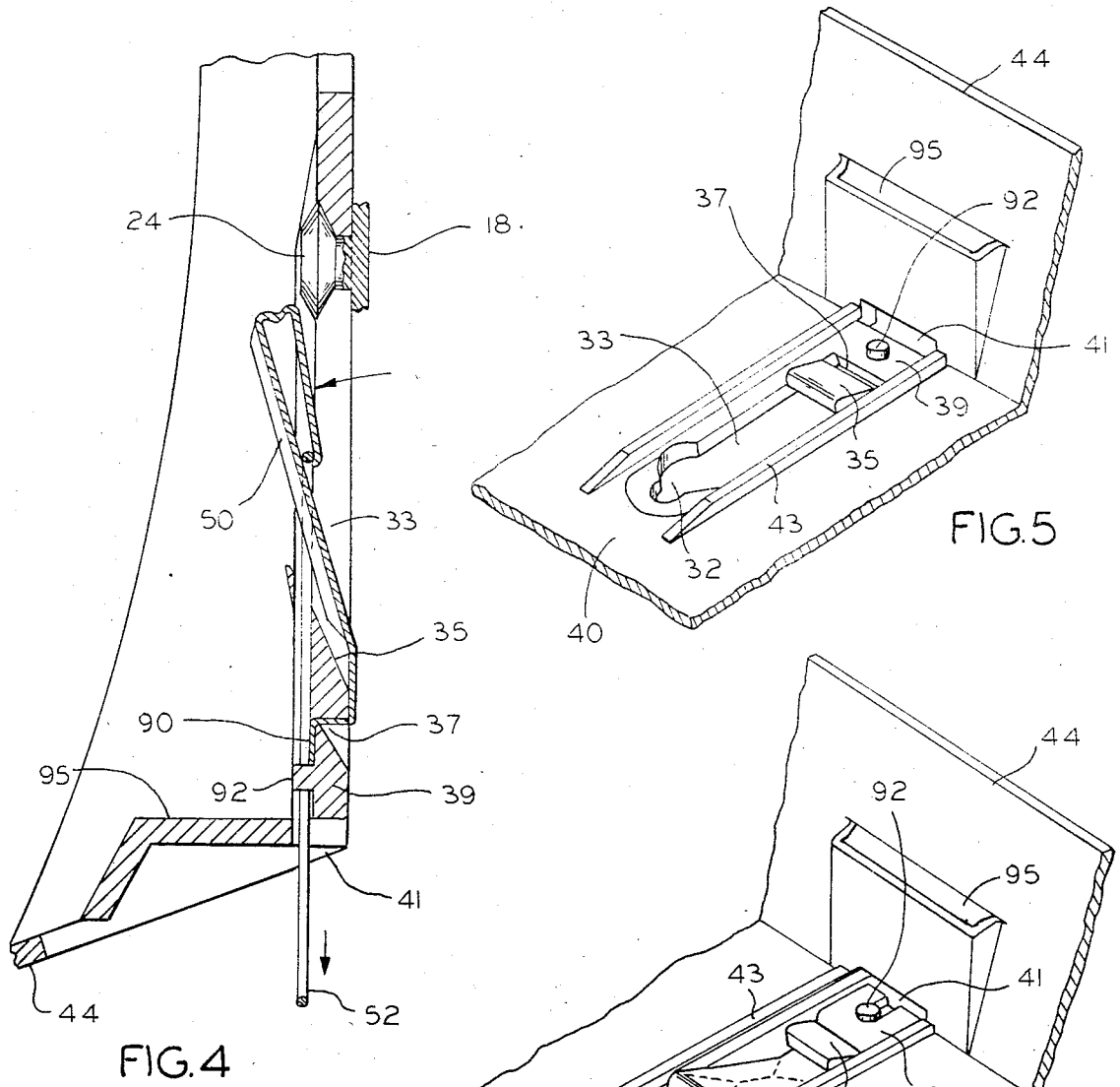
FIG. 4
FIG. 5
FIG. 6
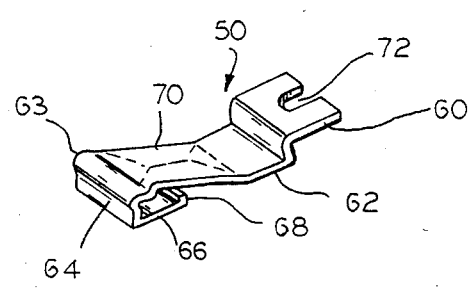
FIG. 7
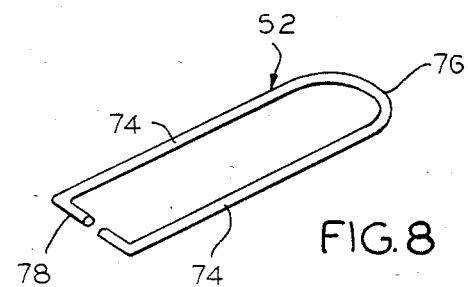
FIG. 8

MODULAR WALL PHONE LATCHING MECHANISM

BACKGROUND OF THE INVENTION

Modular wall telephones in which a detachable plug connected to the telephone is mated with a jack in a mounting receptacle plate, have been common since the mid 1970's. Generally, the receptacle has a central aperture holding a jack recessed behind the plate and has two vertically spaced, headed studs. A modular plug terminating a line cord loosely extends through an opening in the base to reach a mating relation with the jack and connect the phone to the system, this connection being completed prior to the mounting of the phone on the receptacle plate. The base plate has vertically spaced keyhole openings for receiving the headed studs so that the head of the studs rests under the narrowed end of the keyhole to firmly mount the phone on the receptacle plate.

Within this general framework, U.S. Pat. No. 3,898,394 to Ward et al. shows a horizontally slidable, selectively operable latch member to engage the stud under the head and hold the engagement of phone to receptacle plate. U.S. Pat. No. 4,284,855 to Adams et al. shows a variation on the keyhole opening by rendering the sides of the opening yieldable to provide a latching action on the headed stud. Since there is no release mechanism, release is effected by pushing the phone to cause the yieldable sections to deform and enable the stud to pass the narrow waist section of the keyhole openings. U.S. Pat. No. 4,349,706 to Thompson shows a pivotal latch accessible from the interior of the base to latch and release the receptacle mounting.

SUMMARY OF THE INVENTION

The invention is directed to a wall mounting for a modular telephone. The mounting enables a telephone base assembly to be mounted to a wall receptacle and automatically snapped and latched in place on the receptacle. To release the telephone base from the mounting, a latch release spring is actuated to withdraw the latch to enable removal of the phone base.

It is therefore, an object of the invention to provide a modular telephone base mountable on a wall receptacle which automatically latches the base to the receptacle on positioning of the base on the receptacle, the latch of which is accessible from the exterior of mounted telephone to allow release of the latch when desired.

It is a further object of the invention to provide a latch mechanism for a modular wall telephone in which the mechanism includes only two parts external to the base and mounting plate, and the two parts may be readily assembled to the phone base without the need for any tools.

To provide these and other objects, the invention comprises a latch mechanism mounted in the base of a modular wall telephone and comprised of a leaf spring member formed into an almost S shaped retainer for engaging the headed stud of the wall receptacle. To hold the retainer in place, a wire clip is snapped into the retainer such that one end of the clip protrudes out of the edge of the base to enable withdrawal of the engagement of retainer to stud from externally of the base. The retainer is biased to engage the stud when the base is mounted on the receptacle after the stud is guided into a keyhole opening in the base. With the stud at the wider diameter section of the keyhole, the retainer is deflected into the base by the stud head. When the stud body is moved within the narrow terminal end of the keyhole opening, the retainer is biased to engage the head of the stud and latch the base to the receptacle with the stud firmly within the narrow slot end of the keyhole opening.

As mentioned, for release of the latch, the end of the clip exposed outwardly of the edge of the telephone is manually grasped and drawn further outward. This movement pulls the end of the retainer out of its engagement with the stud head and allows the base to be released of its mounting connection to the receptacle studs.

BRIEF DESCRIPTION OF THE DRAWINGS

FIG. 1 is a perspective view of a wall receptacle and the base of a telephone instrument with the base shown separated from the receptacle;

FIG. 2 is a front view of the telephone base of FIG. 1 shown mounted on the receptacle;

FIG. 3 is a section taken along line 3—3 of FIG. 2;

FIG. 4 is a partial view in section similar to FIG. 3 showing the latch mechanism in a released position;

FIG. 5 is a perspective view of the lower central portion of the base of FIGS. 1-3;

FIG. 6 is a perspective view like FIG. 5 with the latch spring in place;

FIG. 7 is a perspective view of the latch spring; and

FIG. 8 is a perspective view of the retainer spring.

DETAILED DESCRIPTION

The wall telephone mounting base 12 of FIG. 1 is adapted to support thereon a telephone set of any conventional type. A smaller version of the desk type phone shown in U.S. Pat. No. Des. 264,338 issued May 11, 1982 is preferred. Such a desk phone is also shown in the publication Electrical Communication published by International Telephone and Telegraph Corporation in its Vol. 54, No. 3-1979 on Page 187.

The base 12 forms the bottom wall of the telephone set, the remainder of the set not being shown otherwise herein. A modular plug 14 connected to the telephone set has sufficient cord to extend through the base central slot to mate with a conventional modular jack 16 in the central opening 20 of a conventional wall receptacle plate 18 of the type made and sold at present by many manufacturers of telephone supplies. The receptacle plate is adapted to mount flush against a wall of a room, as mentioned, and houses the jack 16 for receiving a modular plug in the central rectangular opening 20. The receptacle plate has extending from its front face 22, two vertically spaced apart, headed studs 24 adapted to mate with similarly spaced keyhole openings 30 and 32 in the base 12.

The upper keyhole opening 30 has two circular areas 34 larger in diameter than the head of the stud with a connecting passage 36 smaller than the diameter of the head but greater than the diameter of the stud itself. Each opening 30 and 32 terminates at its upper terminal end in an area 38 equal to the smaller diameter of passage. The lower keyhole opening 32 has a rectangular continuation 33 of the opening, the continuation terminating at an inwardly inclined abutment wall 35. Below the wall is a horizontally elongated narrow slot 37 below which there is a second tapered wall section 39 below which is a further slot 41 at the juncture of the front face and bottom wall of the base. At each side of the slot 32 on the inner side of the opening 33 are spaced rails 43.

Thus, when the base is placed on the studs 24, the stud heads enter the larger diameter area of the openings 30 and 32 and the stud body may pass to the terminal area 38 holding the stud head behind the base lower surface, as the base is lowered to its mounted position. In the mounted position, the head of the studs nests behind the base rear wall with the stud body resting in the opening terminal area 38.

The base, as can be seen best in FIGS. 3–6, has a rear wall surface 40 with mounting feet 42 at the corners, and extending from the rear surface an outwardly and downwardly extending lower wall 44 leading to sidewalls 46 tapering inwardly to join an upwardly flared short extent upper wall 48. The lower wall extends further than the upper wall to incline the front face of the telephone set generally parallel to any flat wall to which the base is mounted.

To firmly hold the base in the mounting position, the latch mechanism of the present invention is used. The latch mechanism is essentially comprised of two parts, a formed flat latch spring 50 and a retainer clip 52 seen best in FIGS. 7 and 8.

The formed flat spring 50 is fabricated of steel sheet material in which an offset 60 is stepped at one end from the general plane 62 of the spring. The upper end 63 of the spring 52 has an inset U 64 formed leading to a doubled back end section 66 with the tip 68 turned inwardly for reasons which will be explained later. The central area of the spring is indented along the centerline 70 (FIG. 7) for longitudinal strength. The spring is stressed to bow the end bearing the inset 64 outwardly as seen in FIG. 7. The stepped end of the spring 50 has a slot 72 incised into the end of its offset 60.

The retainer spring 52 or latch actuator is formed of steel wire which in a preferred form was 0.050" in diameter. The retainer spring has two parallel sides 74 with an arcuate radial section 76 continuous therebetween. The free ends 78 of the springs are turned in toward one another and terminate a short spacing distance from one another as seen best in FIG. 8. From FIG. 8, it is clear that the retainer spring is formed in a single plane.

To mount the latch mechanism in the base, the offset end 60 of flat spring 50 is inserted into the narrow slot 37 in the base and the offset 60 is pushed downwardly to mate the end slot 72 with the pin 92 which is integral to the base. This insertion movement inclines the body of the latch spring within the base rectangular opening continuation 33 and resting against wall 35 as seen in FIG. 6. The wire retainer 52 is then aligned in slot 41 and is spread over the flat spring and the retainer ends separated to snap the free ends 78 of the retainer spring within doubled back end 63 of the latch spring. The parallel sides of the retainer spring are held along the latch spring body past the raised L shaped wall portion 35 of the bottom wall of the base within rails 43. The split end is held within the formed end of the latch spring. Thus, the retainer spring is constrained to sliding movement along its base plane and is accessible externally of the base through slot 41 and through inset 95.

The latch mechanism is assembled in the base 12 before the base is mounted on the wall receptacle 18. In its mounted state, the U end 63 of the latch spring rests adjacent the terminal end 38 of the lower keyhole slot 32 when the base is mounted on the headed stud, the inset end of the latch spring is depressed inwardly by the stud head. When the stud 24 enters the terminal end 38 of the keyhole slot, the latch spring bias automatically tends to push the latch spring 50 toward the headed stud and the stud head will enter the U inset 64 to the position of FIG. 3. In this position, the base is automatically latched to the receptacle plate by the mounting of the headed stud in the terminal end of the keyhole opening.

In order to release the latch mechanism, the retainer spring arcuate end 76 which is accessible externally of the base 12 is grasped manually and is pulled outwardly (downwardly in FIGS. 3 and 4, as shown by the lower directional arrow in FIG. 4). The split end of the retainer spring slides along the indented body of the latch spring 50 and rotates the upper end 63 of the latch spring free of the stud head as shown by the upper directional arrow in FIG. 4, the latch spring being recessed within the base. The inturned tip 68 of the doubled back section 66 prevents the disengagement of the retainer spring and latch spring. The base may be raised to place the headed stud in line with the large area opening 34 of the keyhole and the base 12 may be drawn horizontally and removed.

The latch mechanism may readily be detached from the base for replacement as follows: The sides 74 of the retainer spring 52 are grasped and extended laterally to free the free ends 78 of the spring from the doubled back end 63 of the latch spring 50. The retainer spring, once freed, can be withdrawn from the base through the base slot 41. The latch spring 50 may be detached from the base by inclining the spring through the slot 33 and sliding the slotted end through slit 37.

To restore the latch mechanism to the base, the leaf spring is inserted through slit 37 and inclining the spring to set the end slot 72 on the base pin 92. The wire spring is inserted through base end slot 41 along the base outwardly of slot 33. The leaf spring is inclined so that the inset ends of the wire spring can enter the doubled back end of the leaf spring and the assembly released to rest in the base within the rails 43. Rails 43 prevent the inadvertant release of wire spring 52 from the leaf spring 50.

In this manner, the leaf spring when mounted on the base will be deflected inwardly by the pressure of the headed stud when the stud is in the large diameter section of the keyhole opening. As the stud enters the terminal end of the opening, the latch spring bias deflects the spring outwardly.

By this construction, there is provided a latch mechanism which automatically latches the base to the headed stud of the receptacle plate on installation of the base on the receptacle plate. The mechanism is accessible from externally of the base to allow manual slide operation of the latch mechanism to enable ready removal of the base from the receptacle plate.

I claim:

1. A latch mechanism of a wall telephone instrument for affixing said wall telephone instrument to a wall telephone mounting plate, wherein said wall plate has at least one headed stud extending from the face thereof with said stud spaced from a mounting aperture bearing a modular jack and in which said instrument has an opening in its base for receiving said stud and has a plug member adapted to mate with the jack, said latch mechanism comprising a flat spring member having a head section adapted to engage the head of said stud in a latch position affixing the instrument to said plate, said spring member including a body extending from said head section toward an exposed edge of said instrument with said spring body normally biased toward the headed stud, and a holding member for holding said spring member in engagement with the head of said stud, said holding member accessible from the exposed edge of the instrument to release the engagement of the head section of the spring member with said headed stud to allow removal of the instrument from the mounting plate.

2. A latch mechanism as claimed in claim 1, wherein said spring body is mounted in said instrument base and said body has a mounting tail securing said spring body to said instrument enabling normal flexing movement of said spring member away from the mounting plate.

3. In combination, a base plate of a telephone set for mating with the front face of a wall receptacle and a device for mounting on said base plate to latch the base plate and telephone set carried thereon to said wall receptacle, in which the front face of said receptacle has a jack aperture therein and at least one headed rivet spaced from said aperture, said base plate including a line cord terminating in a modular plug for mating with a jack within the aperture and a keyhole opening for receiving said headed rivet, said latching device including a leaf spring member having a head section adapted to engage the headed rivet in a condition latching the telephone set to the wall receptacle, said leaf spring mounted in said base plate through a mounting opening therein, the head section of said leaf spring normally biased to extend through an opening in said base plate toward the front face of the receptacle, and in which there is means accessible from externally of the base plate and telephone set for releasing said mating on manual actuation of said release means.

4. The combination of claim 3, in which said leaf spring has a stepped tail end for mating with a pin in said base for preventing sliding movement of the body of said leaf spring, and in which the release means comprises a shaped wire spring engaging said leaf spring at said head section and said wire spring has a free end extending out of said base.

5. The combination of claim 4, in which said wire spring is shaped to be readily detachable from said leaf spring to enable slide release of the leaf spring from said base.

6. A latch mechanism adapted to mount in a modular wall telephone instrument including a base for automatic latching action cooperative with a headed stud on a wall receptacle plate for receiving said instrument, in which there is a keyhole opening in said instrument for receiving said headed stud, said latch mechanism including a latch spring intruding into said keyhole opening and a mounting in said instrument for said latch spring to enable said spring to be depressed into said instrument by the impingement thereon of the headed stud, wherein said latch spring is biased so as to automatically position itself in latching engagement with said stud when said stud is moved to the remote end of the keyhole opening, in which said latch spring comprises a formed flat spring with a transverse groove at the end thereof which intrudes into said keyhole opening, and in which said latch spring is assembled into said base within a slot in said base, further comprising a formed wire spring for engaging said flat spring at the intruding end thereof, and said wire spring extends through an opening in the wall of said base to render the mechanism accessible from externally of the base.

* * * * *